United States Patent [19]

Hayashi

[11] Patent Number: 5,119,233
[45] Date of Patent: Jun. 2, 1992

[54] ADJUSTABLE MICROSCOPE ILLUMINATOR

[75] Inventor: George Hayashi, San Jose, Calif.

[73] Assignee: Swift Instruments, Inc., San Jose, Calif.

[21] Appl. No.: 720,019

[22] Filed: Jun. 24, 1991

[51] Int. Cl.⁵ .................. G02B 21/08; F21V 21/34; F21V 21/14
[52] U.S. Cl. .................. 359/390; 362/419; 359/385
[58] Field of Search .................. 359/385–391; 362/419

[56] References Cited

U.S. PATENT DOCUMENTS

| | | | |
|---|---|---|---|
| 277,869 | 5/1883 | Bausch | 359/390 |
| 1,727,618 | 9/1929 | Rife | 359/390 |
| 1,788,712 | 1/1931 | Foster | 359/390 |
| 1,960,554 | 5/1934 | Siedentopf | 359/390 |
| 2,289,575 | 7/1942 | Critoph et al. | 362/419 |
| 2,329,897 | 9/1943 | Heinicke | 240/2 |
| 2,458,967 | 1/1949 | Wiedenhoeft | 362/419 |
| 2,530,352 | 11/1950 | Gallasch | 88/39 |
| 2,691,918 | 10/1954 | Robins et al. | 88/24 |
| 4,299,440 | 11/1981 | Hodgson | 350/81 |
| 4,311,358 | 1/1982 | Gibbons et al. | 350/91 |
| 4,796,985 | 1/1989 | Onanian | 350/523 |
| 4,855,646 | 8/1989 | Peckitt et al. | 315/175 |
| 4,955,978 | 9/1990 | Hayashi | 359/385 |

*Primary Examiner*—Jon W. Henry
*Attorney, Agent, or Firm*—Fish & Richardson

[57] ABSTRACT

An illuminator for a microscope contains a source of light and the microscope has a stage with an opening for upward passage of light from the light source to illuminate a specimen on the stage. The housing defines a window for passage of light from the source through the opening in the stage for illuminating the specimen. The housing also includes first and second support arms, and the housing is adjustable both horizontally and vertically, e.g. relative to the opening in the microscope stage.

20 Claims, 2 Drawing Sheets

ADJUSTABLE MICROSCOPE ILLUMINATOR

FIELD OF THE INVENTION

This invention relates to illuminators for microscopes.

BACKGROUND OF THE INVENTION

Traditional microscopes are illuminated by a mirror-and-fork arrangement or by a tungsten or halogen bulb built into or attached to the stage. Mirror-and-fork arrangements are often not dependable and require frequent realignment. Tungsten and halogen lamps generate heat and thus have relatively short lives. These illuminators do not allow for adjustment of the light source to ensure that the specimen being examined is well lit, nor are they interchangeable between different microscope models.

SUMMARY OF THE INVENTION

According to one aspect of the invention, an illuminator for use with a microscope having a stage defining an opening for upward passage of light to illuminate a specimen disposed upon the stage comprises a housing containing a light source, the housing defining a window for passage of light from the light source through the opening of the microscope stage for illuminating the specimen; a first support arm; a second support arm; first means for adjusting the horizontal position of the housing relative to the first support arm, and second means for adjusting the vertical position of the first arm relative to the second arm; thereby to permit vertical and horizontal adjustment of the position of the light source relative to the opening in the microscope stage; and means for mounting the illuminator upon the microscope.

Preferred embodiments of this aspect of the invention may include one or more of the following features. The first means for adjusting comprises an elongated slot defined by the first arm. Preferably, the first means for adjusting further comprises means for releasably fixing the position of the first arm relative to the housing, and the first means for adjusting further comprises at least one clamp nut extending through the slot and in threaded engagement with the housing. The second means for adjusting comprises an elongated slot defined by the second arm. Preferably, the second means for adjusting further comprises means for releasably fixing the position of the second arm relative to the first arm, and the second means for adjusting further comprises at least one clamp nut extending through the slot and in threaded engagement with the first arm. The illuminator further comprises means for releasably fixing the position of the housing relative to the microscope stage. The stage of the microscope stage has a predetermined thickness, and the means for mounting comprises a member defining a jaw having an opening sized to accommodate the predetermined thickness of the microscope stage, and means for clamping the jaw upon the stage.

According to another aspect of the invention, a microscope has an illuminator containing a source of light and the microscope has a stage defining an opening for upward passage of light from the source to illuminate a specimen disposed upon the stage. The illuminator may comprise one or more of the features described above.

These and other features and advantages of the invention will be seen from the following description of a presently preferred embodiment, and from the claims.

DESCRIPTION OF A PRESENTLY PREFERRED EMBODIMENT

First we briefly describe the drawings.

Figure 1:
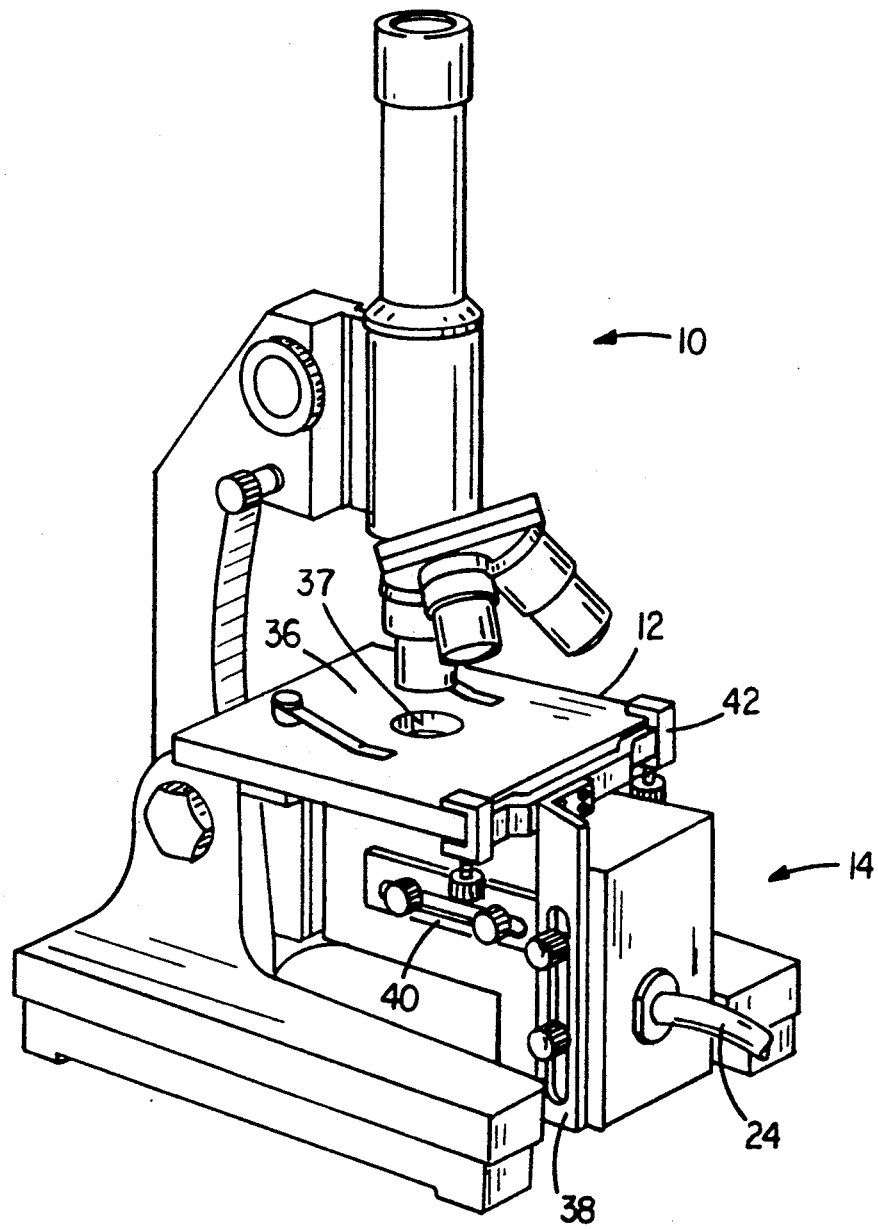
FIG. 1 is a perspective view of a fluorescent illuminator of the invention mounted upon a standard microscope.
Figure 2:
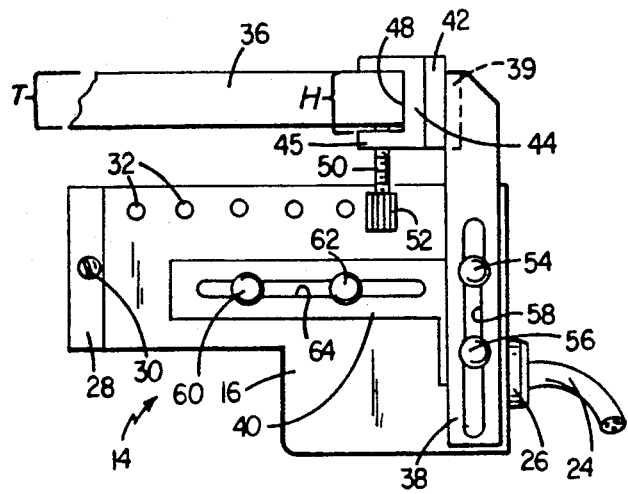
FIG. 2 is a side view of the illuminator of the invention with the microscope stage shown in section.
Figure 3:
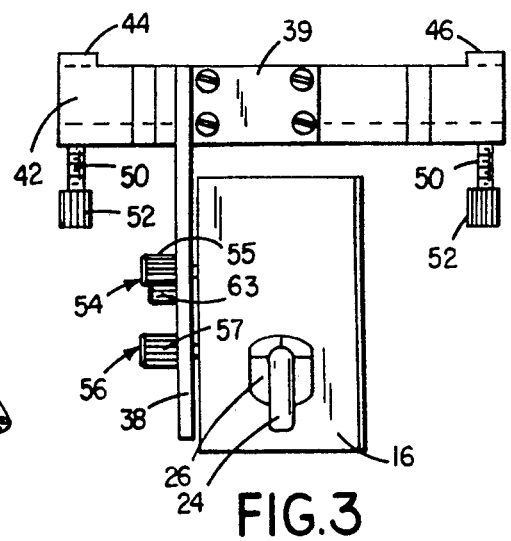
FIG. 3 is a front view of the illuminator of the invention.
Figure 4:
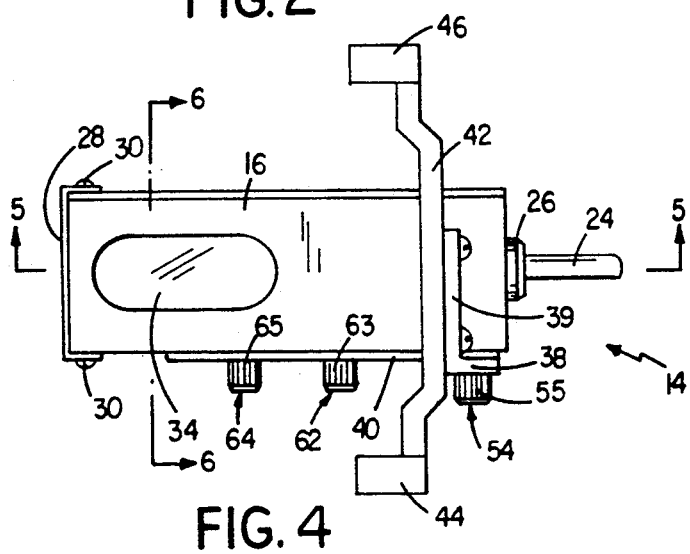
FIG. 4 is a top view of the illuminator of the invention.
Figure 5:
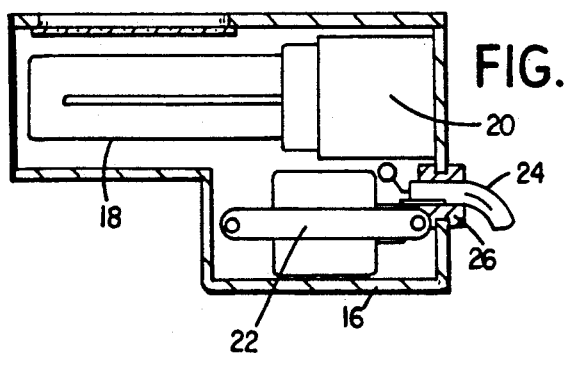
FIG. 5 is a cross-sectional side view of the illuminator of the invention.
Figure 6:
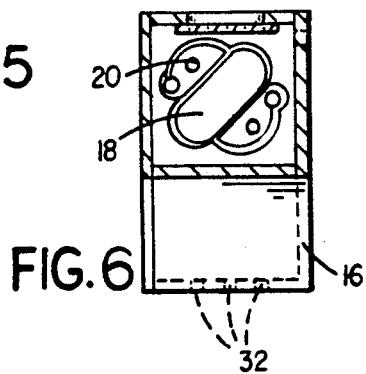
FIG. 6 is a cross-sectional rear view of the illuminator of the invention.

Referring to FIG. 1, a microscope and illuminator assembly 10 consists of a standard laboratory type microscope 12 with fluorescent illuminator 14 of the invention mounted thereupon. Illuminator 14 consists of housing 16 within which there is mounted a fluorescent bulb 18 in a socket 20 with ballast 22. An external power cord 24 extends through grommet 26.

Housing 16 has a cover 28, attached to the housing by screws 30, which may be removed when it is necessary to replace the bulb 18. The bottom, upper and side faces of housing 16 are provided with ventilation holes 32, e.g. about 0.20 inch in diameter.

Located in the upper surface of housing 16 is a long oval shaped glass window 34 having a frosted surface. Advantages of the fluorescent illuminator of the invention include reduced generation of heat for longer life of the light source, and also that the brightness in the microscope objective lens does not change when the housing is adjusted horizontally relative to the microscope stage 36.

Also, as described in Hayashi U.S. Pat. No. 4,955,978 issued Sep. 11, 1990, the disclosure of which is incorporated herein by reference, a U-shaped fluorescent bulb 18 is mounted at a 45° angle to prevent creation of a shadow by the space between the bulb tubes.

The illuminator 14 of the invention further includes a vertical arm 38 and a horizontal arm 40. The vertical arm 38 terminates in a bracket 39 joined to c-clamp arm 42 upon which are attached a pair of c-claps 44, 46, each defining a jaw opening 48 of the dimension H, selected to accommodate a range of thicknesses F of microscope stage 36. A mounting screw 50 with knurled head 52 extends in threaded engagement through the lower jaw 45 of each of the c-clamps 44, 46. The vertical arm 38 is mounted to the horizontal arm 40 by means of clamping nuts 54, 56 in threaded engagement with horizontal arm 40 and extending through elongated slot 58 defined in vertical arm 38. The horizontal arm 40 in turn is attached to the illuminator housing 16 by means of clamp nuts 60, 62 in threaded engagement and the housing 16 and extending through elongated slot 64 defined in horizontal arm 40. Both sets of clamp nuts 54, 56 and 60, 62 have enlarged knurled heads (55, 57 and 61, 63, respectively) to facilitate loosening and tightening for adjustment of the illuminator 14 relative to stage 36, as will now be described.

An illuminator 14 of the invention is adapted for use in combination with a laboratory microscope 12 in order to provide the advantages mentioned above.

Illuminator 14 is prepared by loosening mounting screws 50 to increase the dimension H to accommodate the thickness T of the front of the microscope stage 36. The c-clamps 44, 46 are engaged upon the stage, and screws 50 tightened (using knurled heads 52) until the illuminator 14 is fixed to the stage 36, forming microscope and illuminator assembly 10 (FIG. 1).

The position of window 34, through which passes light from bulb 18, is next adjusted relative to an opening 37 in the stage 36 in order to provide the desired level of illumination. The position of the illuminator 14 is adjusted by loosening clamp nuts 54, 56 and 60, 62 to allow the housing 16 to be moved horizontally and vertically until the desired positioning is achieved. The position of the illuminating light source may then be fixed by tightening the clamp nuts 54, 56 and 60, 62.

Other embodiments are with the following claims.

What is claimed is:

1. An illuminator for use with a microscope having a stage defining an opening for upward passage of light to illuminate a specimen disposed upon the stage,
    said illuminator comprising:
    a housing containing a light source, said housing defining a window for passage of light from said light source through the opening of the microscope stage for illuminating the
    a first support arm;
    a second support arm;
    first means for permitting movement of said housing along said first support arm in a manner to adjust the position of said housing in a first plane parallel to the microscope stage; and
    second means for permitting movement of said first support arm along said second support arm in a manner to adjust the position of said housing in a second plane perpendicular to the microscope stage;
    thereby to permit vertical and horizontal adjustment of the position of said light source relative to the opening in the microscope stage; and
    means for mounting said illuminator upon the microscope.

2. An illuminator for use with a microscope having a stage defining an opening for upward passage of light to illuminate a specimen disposed upon the stage.
    said illuminator comprising:
    a housing containing a light source, said housing defining a window for passage of light from said light source through the opening of the microscope stage for illuminating the specimen;
    a first support arm;
    a second support arm;
    first means for adjusting the horizontal position of said housing relative to said first support arm, said first means for adjusting comprising an elongated slot defined by said first arm, and
    second means for adjusting the vertical position of said first arm relative to said second arm;
    thereby to permit vertical and horizontal adjustment of the position of said light source relative to the opening in the microscope stage; and
    means for mounting said illuminator upon the microscope.

3. The microscope illuminator of claim 2 wherein said first means for adjusting further comprises means for releasably fixing the position of said first arm relative to said housing.

4. The microscope illuminator of claim 3 wherein said first means for adjusting further comprises at least one clamp nut extending through said slot and in threaded engagement with said housing.

5. The microscope illuminator of claim 1 wherein said second means for adjusting comprises an elongated slot defined by said second arm.

6. The microscope illuminator of claim 5 wherein said second means for adjusting further comprises means for releasably fixing the position of said second arm relative to said first arm.

7. The microscope illuminator of claim 6 wherein said seconds means for adjusting further comprises at least one clamp nut extending through said slot and in threaded engagement with said first arm.

8. The microscope illuminator of claim 1 wherein said illuminator further comprises means for releasably fixing the position of said housing relative to the microscope stage.

9. The microscope illuminator of claim 1 wherein the stage of the microscope stage has a predetermined thickness, and said means for mounting comprises a member defining a jaw having an opening sized to accommodate the predetermined thickness of the microscope stage, and means for clamping said jaw upon said stage.

10. An illuminator for use with a microscope having a stage defining an opening for upward passage of light to illuminate a specimen disposed upon the stage,
    said illuminator comprising:
    a housing containing a light source, said housing defining a window for passage of light from said light source through the opening of the microscope stage for illuminating the specimen;
    a first support arm;
    a second support arm;
    first means for adjusting the horizontal position of said housing relative to said first support arm, said first means comprising an elongated slot defined by said first arm and means for releasably fixing the position of said first arm relative to said housing comprising at least one clamp nut extending through said slot and in threaded engagement with said housing;
    second means for adjusting the vertical position of said first arm relative to said second arm, said second means comprising an elongated slot defined by said second arm and means for releasably fixing the position of said second arm relative to said first arm comprising at least one clamp nut extending through said slot and in threaded engagement with said first arm;
    thereby to permit vertical and horizontal adjustment of the position of said light source relative to the opening in the microscope stage; and
    means for mounting said illuminator upon the microscope.

11. The microscope illuminator of claim 10 wherein the stage of the microscope stage has a predetermined thickness, and said means for mounting comprises a member defining a jaw having an opening sized to accommodate the predetermined thickness of the microscope stage, and means for clamping said jaw upon said stage.

12. A microscope having an illuminator, said illuminator containing a source of light and said microscope having a stage defining an opening for upward passage of light from said source to illuminate a specimen disposed upon the stage, said illuminator comprising:
- a housing containing a light source, said housing defining a window for passage of light from said light source through the opening of the microscope stage for illuminating the specimen;
- a first support arm;
- a second support arm;
- first means for adjusting the horizontal position of said housing relative to said first support arm, and
- second means for adjusting the vertical position of said first arm relative to said second arm;
- thereby to permit vertical and horizontal adjustment of the position of said light source relative to the opening in the microscope stage; and
- means for mounting said illuminator upon the microscope.

13. The microscope and illuminator of claim 12 wherein said first means for adjusting comprises an elongated slot defined by said first arm.

14. The microscope and illuminator of claim 13 wherein said first means for adjusting further comprises means for releasably fixing the position of said first arm relative to said housing.

15. The microscope and illuminator of claim 14 wherein said first means for adjusting further comprises at least one clamp nut extending through said slot and in threaded engagement with said housing.

16. The microscope and illuminator of claim 12 wherein said second means for adjusting comprises an elongated slot defined by said second arm.

17. The microscope and illuminator of claim 16 wherein said second means for adjusting further comprises means for releasably fixing the position of said second arm relative to said first arm.

18. The microscope and illuminator of claim 17 wherein said seconds means for adjusting further comprises at least one clamp nut extending through said slot and in threaded engagement with said first arm.

19. The microscope and illuminator of claim 12 wherein said illuminator further comprises means for releasably fixing the position of said housing relative to the microscope stage.

20. A microscope having an illuminator, said illuminator containing a source of light and said microscope having a stage defining an opening for upward passage of light from said source to illuminate a specimen disposed upon the stage, said illuminator comprising:
- a housing containing a light source, said housing defining a window for passage of light from said light source through the opening of the microscope stage for illuminating the specimen;
- a first support arm;
- a second support arm;
- first means for adjusting the horizontal position of said housing relative to said first support arm, said first means comprising an elongated slot defined by said first arm and means for releasably fixing the position of said first arm relative to said housing comprising at least one clamp nut extending through said slot and in threaded engagement with said housing;
- second means for adjusting the vertical position of said first arm relative to said second arm, said second means comprising an elongated slot defined by said second arm and means for releasably fixing the position of said second arm relative to said first arm comprising at least one clamp nut extending through said slot and in threaded engagement with said first arm;
- thereby to permit vertical and horizontal adjustment of the position of said light source relative to the opening in the microscope stage.

* * * * *

UNITED STATES PATENT AND TRADEMARK OFFICE
CERTIFICATE OF CORRECTION

PATENT NO. : 5,119,233
DATED : June 2, 1992
INVENTOR(S) : George Hayashi

It is certified that error appears in the above-indentified patent and that said Letters Patent is hereby corrected as shown below:

In the Abstract, line 4, insert -- The illuminator has a housing containing the light source after "stage".

Col. 3, line 29; insert --specimen;-- after "the"

Signed and Sealed this

Fourteenth Day of September, 1993

Attest:

BRUCE LEHMAN

Attesting Officer     Commissioner of Patents and Trademarks